(12) United States Patent
Gong et al.

(10) Patent No.: US 10,904,838 B2
(45) Date of Patent: *Jan. 26, 2021

(54) METHOD OF POWER CONTROL FOR UPLINK TRANSMISSION

(71) Applicant: Huawei Technologies Co., Ltd., Shenzhen (CN)

(72) Inventors: Zhengwei Gong, Ottawa (CA); Amine Maaref, Ottawa (CA); Yu Cao, Ottawa (CA); Toufiqul Islam, Sunnyvale, CA (US); Weimin Xiao, Hoffman Estates, IL (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/597,189

(22) Filed: Oct. 9, 2019

(65) Prior Publication Data

US 2020/0045641 A1 Feb. 6, 2020

Related U.S. Application Data

(63) Continuation of application No. 16/503,889, filed on Jul. 5, 2019, now Pat. No. 10,484,950, which is a
(Continued)

(51) Int. Cl.
*H04W 52/14* (2009.01)
*H04W 52/24* (2009.01)
*H04W 52/36* (2009.01)

(52) U.S. Cl.
CPC ....... *H04W 52/146* (2013.01); *H04W 52/242* (2013.01); *H04W 52/365* (2013.01)

(58) Field of Classification Search
CPC combination set(s) only.
See application file for complete search history.

(56) References Cited

U.S. PATENT DOCUMENTS 8,913,555 B2 * 12/2014 Higuchi ............ H04B 7/15535
370/328
2013/0040689 A1 2/2013 Iwai et al.
(Continued)

FOREIGN PATENT DOCUMENTS

CN 102045823 A 5/2011
CN 103959868 A 7/2014
(Continued)

OTHER PUBLICATIONS

Interdigital Communications, "Power Control for NR", 3GPP TSG RAN WG1 Meeting #88bis, R1-1705437, Apr. 3-7, 2017, 4 Pages, Spokane, Washington.
(Continued)

*Primary Examiner* — Yuwen Pan
*Assistant Examiner* — Erica L Fleming-Hall
(74) *Attorney, Agent, or Firm* — Slater Matsil, LLP

(57) ABSTRACT

A method for uplink transmission by a UE includes obtaining information regarding a plurality of power control sets each having a plurality of power control parameters, wherein a value of at least one parameter in a first power control set is different from a value of the at least one parameter in a second power control set; obtaining information associating at least one of the power control sets with at least one operational property of the UE; and when at least one of the operational properties is in effect on the UE, transmitting a PUSCH using the parameters of the power control set associated with the at least one operational property in effect.

20 Claims, 12 Drawing Sheets

Related U.S. Application Data continuation of application No. PCT/CN2018/085137, filed on Apr. 28, 2018.

(60) Provisional application No. 62/502,396, filed on May 5, 2017.

(56) References Cited

U.S. PATENT DOCUMENTS

| | | | | |
|---|---|---|---|---|
| 2013/0077571 | A1* | 3/2013 | Papasakellariou | H04W 74/004 370/328 |
| 2013/0272231 | A1 | 10/2013 | Dinan | |
| 2014/0036809 | A1* | 2/2014 | Xu | H04W 52/325 370/329 |
| 2014/0105110 | A1* | 4/2014 | Hoshino | H04W 52/325 370/328 |
| 2014/0219126 | A1* | 8/2014 | Li | H04W 52/146 370/252 |
| 2014/0274196 | A1* | 9/2014 | Dai | H04W 52/242 455/522 |
| 2014/0302866 | A1 | 10/2014 | Lee et al. | |
| 2015/0223213 | A1* | 8/2015 | Moon | H04W 52/40 370/329 |
| 2015/0282092 | A1* | 10/2015 | Nakamura | H04W 16/32 455/522 |
| 2015/0358924 | A1* | 12/2015 | Papasakellariou | H04W 72/0473 370/329 |
| 2016/0127999 | A1* | 5/2016 | Li | H04W 52/54 370/294 |
| 2016/0165547 | A1* | 6/2016 | Ouchi | H04W 52/146 455/522 |
| 2016/0183195 | A1* | 6/2016 | Gao | H04W 52/325 455/522 |
| 2016/0219534 | A1* | 7/2016 | Hao | H04W 52/146 |
| 2016/0227491 | A1* | 8/2016 | Park | H04L 5/1438 |
| 2016/0242125 | A1* | 8/2016 | Lee | H04W 52/146 |
| 2016/0301515 | A1* | 10/2016 | Ouchi | H04W 72/1226 |
| 2019/0044681 | A1* | 2/2019 | Zhang | H04L 5/0094 |
| 2019/0191382 | A1* | 6/2019 | Zhang | H04W 52/325 |
| 2019/0335400 | A1* | 10/2019 | Gong | H04W 52/146 |
| 2019/0349864 | A1* | 11/2019 | Zhang | H04W 52/42 |
| 2019/0364511 | A1* | 11/2019 | Chen | H04W 52/08 |
| 2020/0008155 | A1* | 1/2020 | Li | H04W 52/04 |
| 2020/0053724 | A1* | 2/2020 | MolavianJazi | H04W 52/146 |
| 2020/0068497 | A1* | 2/2020 | Gong | H04W 52/146 |
| 2020/0100193 | A1* | 3/2020 | Cheng | H04W 72/1268 |
| 2020/0245253 | A1* | 7/2020 | Chen | H04W 52/08 |
| 2020/0267664 | A1* | 8/2020 | Iwai | H04W 52/246 |

FOREIGN PATENT DOCUMENTS

| | | |
|---|---|---|
| CN | 104349443 A | 2/2015 |
| CN | 105723781 A | 6/2016 |
| CN | 106413052 A | 2/2017 |
| CN | 106455030 A | 2/2017 |
| CN | 106465295 A | 2/2017 |
| CN | 106830508 A | 6/2017 |
| EP | 2770785 B1 | 6/2016 |
| EP | 3032893 A1 | 6/2016 |
| KR | 20150105647 A | 9/2015 |
| KR | 20170018059 A | 2/2017 |

OTHER PUBLICATIONS

LG Electronics, "Discussion on uplink power control for NR", 3GPP TSG RAN WG1 Meeting #88, R1-1702468, Feb. 13-17, 2017, 6 Pages, Athens, Greece.

Nokia, et al., "UL Interference Coordination and Power Control", 3GPP TSG-RAN WG1#NR, R1-1701147, Jan. 16-20, 2017, 4 Pages, Spokane, U.S.A.

3rd Generation Partnership Project; Technical Specification Group Radio Access Network; Evolved Universal Terrestrial Radio Access (E-UTRA); NB-IOT; Technical Report for BS and UE radio transmission and reception, (Release 13), 3GPP TR 36.802, V13.0.0, Jun. 2016, 59 Pages.

3rd Generation Partnership Project; Technical Specification Group Radio Access Network; Evolved Universal Terrestrial Radio Access (E-UTRA); Physical layer procedures, (Release 13), 3GPP TS 36.213 V13.5.0, Mar. 2017, 387 Pages.

Ericsson, "On power control for NR", 3GPP TSG-RAN WG1 #88bis, R1-1705916, Apr. 3-7, 2017, 3 Pages, Spokane, USA.

Interdigital Communicatoins, "On Power Control Processes for Multi Beam Transmission in NR", 3GPP TSG RAN WG1, Meeting #88ibs, R1-1705515, Apr. 3-7, 2014, 4 Pages, Spokane, USA.

MCC Support, Final Report of 3GPP TSG RAN WTG1 #87 v1.0.0, (Reno, USA, Nov. 14-18, 2016), 3GPP TSG RAN WG1 Meeting #88, R1-1701552, Feb. 13-17, 2017, 156 Pages, Athens, Greece.

Nokia et al., "UL Power Control for MIMO", 3GPP TSG RAN WG1 #88bis, R1-1705978, Apr. 3-7, 2017, 6 Pages, Spokane, WA, USA.

NTT DOCOMO, INC., "Uplink power control considering waveform switching", 3GPP TSG-RAN WG1, Meeting #88bis, R1-1705727, Apr. 3-7, 2017, 2 pages, Spokane, USA.

"RAN1 Chairman's Notes", 3GPP TSG RAN WG1 Meeting #88ibs, Apr. 3-7, 2017, 113 Pages, Spokane , USA.

Samsung, "UL Power Control Aspects", 3GPP TSG RAN WG1, Meeting #88ibs, R1-1705363, Apr. 3-7, 2017, 3 Pages, Spokane, USA.

* cited by examiner

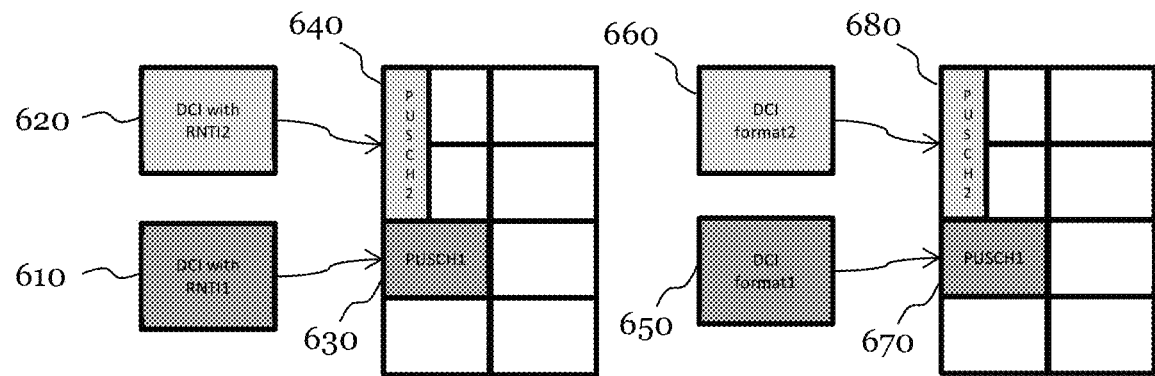
Figure 6A                    Figure 6B
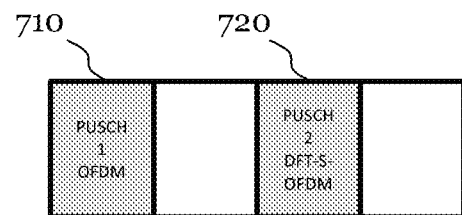
Figure 7

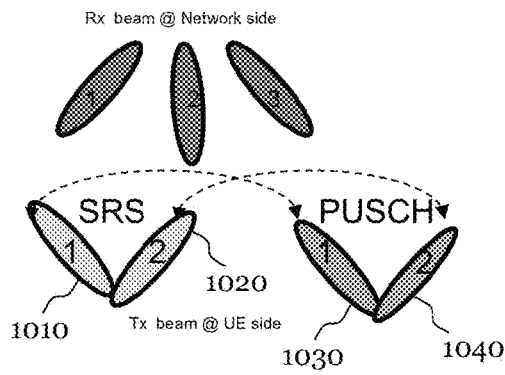 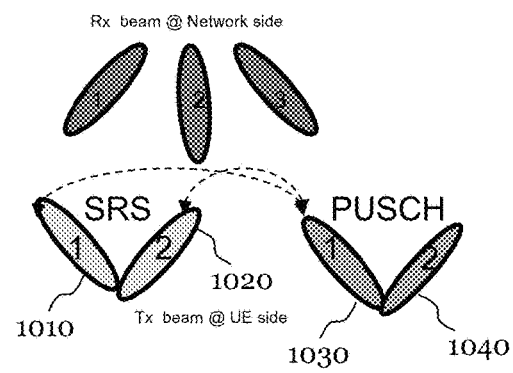
Figure 10A          Figure 10B
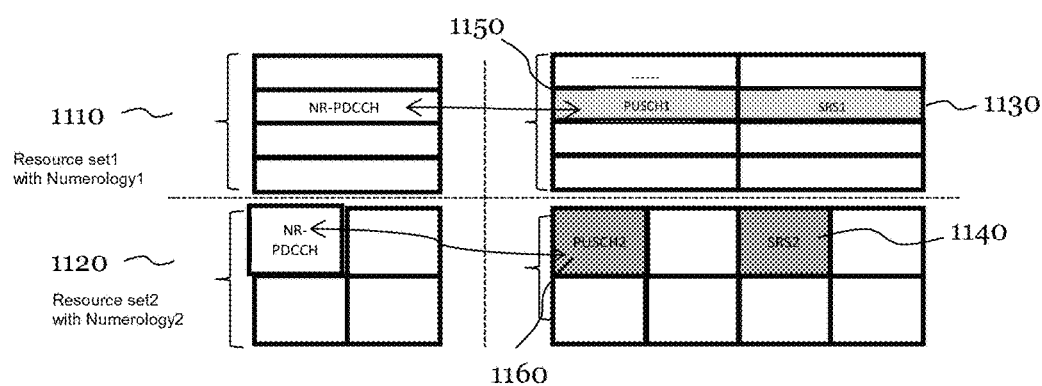
Figure 11

METHOD OF POWER CONTROL FOR UPLINK TRANSMISSION

CROSS-REFERENCE TO RELATED APPLICATIONS

This application is a continuation of U.S. patent application Ser. No. 16/503,889, filed on Jul. 5, 2019, entitled "Method of Power Control for Uplink Transmission," which is a continuation of PCT Application Serial No. PCT/CN2018/085137, filed on Apr. 28, 2018, entitled "Method of Power Control for Uplink Transmission", which claims benefit to U.S. Provisional Application No. 62/502,396, filed on May 5, 2017, entitled "Method of Power Control for Uplink Transmission", the disclosures of which are hereby incorporated herein by reference in their entireties.

TECHNICAL FIELD

The present disclosure relates generally to wireless communication and, in particular embodiments, to a system and method for power control for uplink transmissions.

BACKGROUND

In Long Term Evolution (LTE) networks, each cell is typically served by one transmit/receive point (TRP) that is associated with a unique cell identifier (ID). In the emerging New Radio (NR) systems, each NR cell may include multiple TRPs using the same cell ID. An NR cell may cover a much broader area than an LTE cell. NR systems can support grant-free transmissions, multi-beam communications, multi-numerology transmissions, multi-waveform transmissions, multiple reference signals and other features. Grant-free Physical Uplink Shared Channel (PUSCH) transmissions can include a PUSCH without grant scheduling but with a Radio Resource Control (RRC) connection (e.g., the RRC Connected state) or can include a PUSCH without either grant scheduling or an RRC connection (e.g., Idle state or RRC_INACTIVE state).

In LTE, the transmission power for the PUSCH can be derived by a user equipment (UE) based on several parameters including the bandwidth of the PUSCH resource assignment, the downlink pathloss estimate calculated in the UE based on a cell-specific reference signal (CRS), a compensation factor for pathloss, dynamic assignment parameters related to the modulation and coding scheme (MCS), and a Transmit Power Command (TPC) within the dynamic assignment to adjust a power offset. Another factor used in determining the transmission power for the PUSCH is the PUSCH initial target power, which can have different values depending on the PUSCH type. In a first type, the PUSCH is scheduled with a dynamic downlink assignment or grant, a cell-specific component (e.g., initial target power1) is provided from a broadcast channel (e.g., the System Information Block (SIB)), and a UE-specific component (e.g., initial target power2) is provided by a dedicated channel (e.g., RRC). In a second type, the PUSCH is semi-persistently scheduled without a dynamic downlink assignment or grant, and two UE-specific parameters (e.g., initial target power1 and initial target power2) are used if provided by a dedicated channel (e.g., RRC). Otherwise, a cell-specific component (e.g., initial target power1) is provided from a broadcast channel (e.g., the SIB), and a UE-specific component (e.g., initial target power2) is provided by a dedicated channel (e.g., RRC). A third PUSCH type corresponds to a random access response grant. Parameters that make up the grant might be provided from a broadcast channel (e.g., the SIB). Different power control may be used for the Sounding Reference Signal (SRS) in different cells, and the power control for the SRS may or may not be related to that used for the PUSCH.

SUMMARY

In accordance with an embodiment of the present disclosure, a method for uplink transmission by a UE includes obtaining information regarding a plurality of power control sets each having a plurality of power control parameters, wherein a value of at least one parameter in a first power control set is different from a value of the at least one parameter in a second power control set; obtaining information associating at least one of the power control sets with at least one operational property of the UE; and when at least one of the operational properties is in effect on the UE, transmitting a PUSCH using the parameters of the power control set associated with the at least one operational property in effect. The at least one operational property might be a property associated with at least one of a resource assignment type for the PUSCH; a numerology configuration for the PUSCH; a scheduling time unit length; DCI-related information; an associated SRS resource index; or a DL RS type for pathloss estimation.

In accordance with another embodiment of the present disclosure, a method for uplink transmission by a UE includes obtaining information regarding a plurality of power control sets each having a plurality of power control parameters, wherein a value of at least one parameter in a first power control set is different from a value of the at least one parameter in a second power control set; obtaining information associating at least one of the power control sets with at least one operational property of the UE; and when at least one of the operational properties is in effect on the UE, transmitting an SRS using the parameters of the power control set associated with the at least one operational property in effect. The at least one operational property might be a property associated with at least one of resource information, numerology information, or a DL RS type for pathloss estimation.

In accordance with another embodiment of the present disclosure, a method for uplink transmission by a UE includes obtaining information regarding a plurality of power control sets each having a plurality of power control parameters, wherein a value of at least one parameter in a first power control set is different from a value of the at least one parameter in a second power control set; obtaining information associating at least one of the power control sets with at least one operational property of the UE; and when at least one of the operational properties is in effect on the UE, transmitting a signal using the parameters of the power control set associated with the at least one operational property in effect.

According to an aspect, a method for uplink transmission by a user equipment (UE), includes transmitting a first physical uplink shared channel (PUSCH) according to a first power control set, the first power control set including a first UE-specific PUSCH initial target power, a first pathloss, a first pathloss compensation factor, and a first transmit power command, the first power control set being determined based on a first set of operational properties, the first set of operational properties including at least one of a first resource assignment type for the first PUSCH, a first numerology configuration for the first PUSCH, a first scheduling time unit length, first downlink control information (DCI)- related information, a first sounding reference signal (SRS) resource index, or a first downlink (DL) reference signal (RS) type for pathloss estimation.

Optionally, in any of the preceding embodiments, the method further includes: transmitting a second PUSCH according to a second power control set, the second power control set including a second UE-specific PUSCH initial target power, a second pathloss, a second pathloss compensation factor, and a second transmit power command, the second power control set being determined based on a second set of operational properties, the second set of operational properties including at least one of a second resource assignment type for the second PUSCH, a second numerology configuration for the second PUSCH, a second scheduling time unit length, second DCI-related information, a second SRS resource index, or a second DL RS type for pathloss estimation.

Optionally, in any of the preceding embodiments, information associating the first power control set with the first set of operational properties and information associating the second power control set with the second set of operational properties is obtained by at least one of predefinition, broadcast signaling, or dedicated signaling from a network.

Optionally, in any of the preceding embodiments, the first power control set further comprises a cell-specific PUSCH initial target power configured by system information for both the first power control set and the second power control set.

Optionally, in any of the preceding embodiments, the first power control set and the second power control set are different based on at least one of UE-specific PUSCH initial target power, pathloss, pathloss compensation factor, and transmit power command.

Optionally, in any of the preceding embodiments, the first UE-specific PUSCH initial target power for the first power control set and the second UE-specific PUSCH initial target power for the second power control set are configured with a first value and a second value by RRC signaling.

Optionally, in any of the preceding embodiments, the first UE-specific PUSCH initial target power for the first power control set and the second UE-specific PUSCH initial target power for the second power control set are configured with a common value by RRC signaling.

Optionally, in any of the preceding embodiments, the first pathloss for the first power control set and the second pathloss for the second power control set are configured to be estimated with a first DL RS type and a second DL RS type, or with a common RS type using one of a first DL RS type and a second DL RS type by RRC signaling.

Optionally, in any of the preceding embodiments, the first or second DL RS type is: a synchronization signal for Layer3 measurement; or a UE-specific RS for Layer3 measurement.

Optionally, in any of the preceding embodiments, the first pathloss compensation factor for the first power control set, and the second pathloss compensation factor for the second power control set, are configured with a first value and a second value, or with a common value, by RRC signaling.

Optionally, in any of the preceding embodiments, the first transmit power command for the first power control set, and the second transmit power command for the second power control set are configured to be two transmit power commands or one common transmit power command by RRC signaling.

Optionally, in any of the preceding embodiments, the first or second resource assignment type for the first or second PUSCH is at least one of: a resource assignment based only on DCI; a resource assignment based on DCI together with at least one of RRC signaling or system information; or a resource assignment based only on at least one of RRC signaling or system information.

Optionally, in any of the preceding embodiments, the first or second scheduling time unit length is at least one of: a number of orthogonal frequency division multiplexing (OFDM) symbols; a mini-slot; a slot; or a slot group.

Optionally, in any of the preceding embodiments, the first or second DCI-related information is at least one of: a DCI format; or a DCI structure.

Optionally, in any of the preceding embodiments, the UE computes a plurality of power headrooms for a plurality of PUSCH transmissions associated with different scheduling time unit lengths, wherein the scheduling time unit lengths are at least one of: a number of OFDM symbols; a mini-slot; a slot; a slot group; or an OFDM symbol time length associated with a specific numerology.

Optionally, in any of the preceding embodiments, in response to the UE transmitting a PUSCH associated with a first scheduling time unit length, the UE computes a first power headroom in accordance with power control set parameters for the PUSCH associated with the first scheduling time unit length, and in response to the UE transmitting a PUSCH associated with a second scheduling time unit length, the UE computes a second power headroom in accordance with power control set parameters for the PUSCH associated with the second scheduling time unit length.

According to another aspect, a method for uplink transmission by a user equipment (UE) includes: transmitting a first sounding reference signal (SRS) according to a first power control set, the first power control set including a first UE-specific SRS initial target power, a first pathloss, a first pathloss compensation factor, and a first transmit power command, the first power control set being determined based on a first set of operational properties, the first set of operational properties including at least one of a first resource information for the first SRS, a first numerology information for the first SRS, or a first downlink (DL) reference signal (RS) type for pathloss estimation.

Optionally, in any of the preceding embodiments, the method further includes transmitting a second SRS according to a second power control set, the second power control set including a second UE-specific SRS initial target power, a second pathloss, a second pathloss compensation factor, and a second transmit power command, the second power control set being determined based on a second set of operational properties, the second set of operational properties including at least one of a second resource information for the second SRS, a second numerology information for the second SRS, or a second downlink (DL) reference signal (RS) type for pathloss estimation.

Optionally, in any of the preceding embodiments, the first transmit power command is configured by radio resource control (RRC) signaling with a first power control set for SRS partially derived from a first transmit power command for an associated first physical uplink shared channel (PUSCH), and the second transmit power command is configured by RRC signaling with a second power control set for SRS partially derived from a second transmit power command for an associated second PUSCH.

Optionally, in any of the preceding embodiments, the method further includes a third power control set associated with both first SRS with the first resource information and second SRS with the second resource information.

Optionally, in any of the preceding embodiments, a transmit power command for the third power control set is configured to be derived from the first or second transmit power command for the PUSCH associated with the first or second resource information by RRC signaling.

Optionally, in any of the preceding embodiments, the third power control set further comprises one or more of UE-specific SRS initial target power, pathloss, pathloss compensation factor and transmit power command, which is different from both the first power control set and the second power control set, and configured with RRC signaling.

Optionally, in any of the preceding embodiments, the first or second resource information is at least one of: a configured resource index for SRS transmission; or Quasi-Co-Location (QCL) information with a downlink Channel State Information Reference Signal (CSI-RS).

Optionally, in any of the preceding embodiments, the first or second numerology information comprises a configured numerology for SRS transmission.

Optionally, in any of the preceding embodiments, the first or second DL RS type is at least one of: a synchronization signal for Layer3 measurement; or a UE-specific RS for Layer3 measurement.

According to a further aspect, a method for uplink transmission by a user equipment (UE), includes: obtaining information regarding a plurality of power control sets each having a set of one UE-specific PUSCH initial target power, one pathloss, one pathloss compensation factor, and one transmit power command, wherein a first power control set and a second power control set are different based on at least one of the UE-specific PUSCH initial target power, the pathloss, the pathloss compensation factor, or the transmit power command; obtaining information regarding a plurality of sets of operational properties each having at least one of a resource assignment type, a numerology configuration, a scheduling time unit, a DCI-related information, sounding reference signal (SRS) resource index, or a DL RS type for pathloss estimation; obtaining information associating a plurality of the power control sets with a plurality of sets of operational properties; and in response to one set of the operational properties being in effect on the UE, transmitting a physical uplink shared channel using the power control set associated with the one set of operational properties in effect.

According to a further aspect, a method for uplink transmission by a user equipment (UE) includes: obtaining information regarding a plurality of power control sets each having a set of one UE-specific SRS initial target power, one pathloss, one pathloss compensation factor, and one transmit power command, wherein a first power control set and a second power control set are different based on at least one of the UE-specific SRS initial target power, the pathloss, the pathloss compensation factor, or the transmit power command; obtaining information regarding a plurality of sets of operational properties each having at least one of a resource information, a numerology information, or a downlink (DL) reference signal (RS) type for pathloss estimation; obtaining information associating a plurality of the power control sets with a plurality of sets of operational properties; and in response to one set of the operational properties being in effect on the UE, transmitting a sounding reference signal using the power control set associated with the one set of operational properties in effect.

BRIEF DESCRIPTION OF THE DRAWINGS

For a more complete understanding of the present disclosure, and the advantages thereof, reference is now made to the following description taken in conjunction with the accompanying drawings, in which:

FIG. 6A is a diagram of power control for the PUSCH selected based on an association with a plurality of RNTIs, according to some embodiments;

FIG. 6B is a diagram of power control for the PUSCH selected based on an association with a DCI format, according to some embodiments;

FIG. 7 is a diagram of power control for the PUSCH selected based on an association with a waveform type, according to some embodiments;

FIG. 10A is a diagram of power control for the SRS, according to some embodiments;

FIG. 10B is another diagram of power control for the SRS, according to some embodiments;

FIG. 11 is a diagram of power control for the SRS selected based on an association with a numerology, according to some embodiments;

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Figure 1:
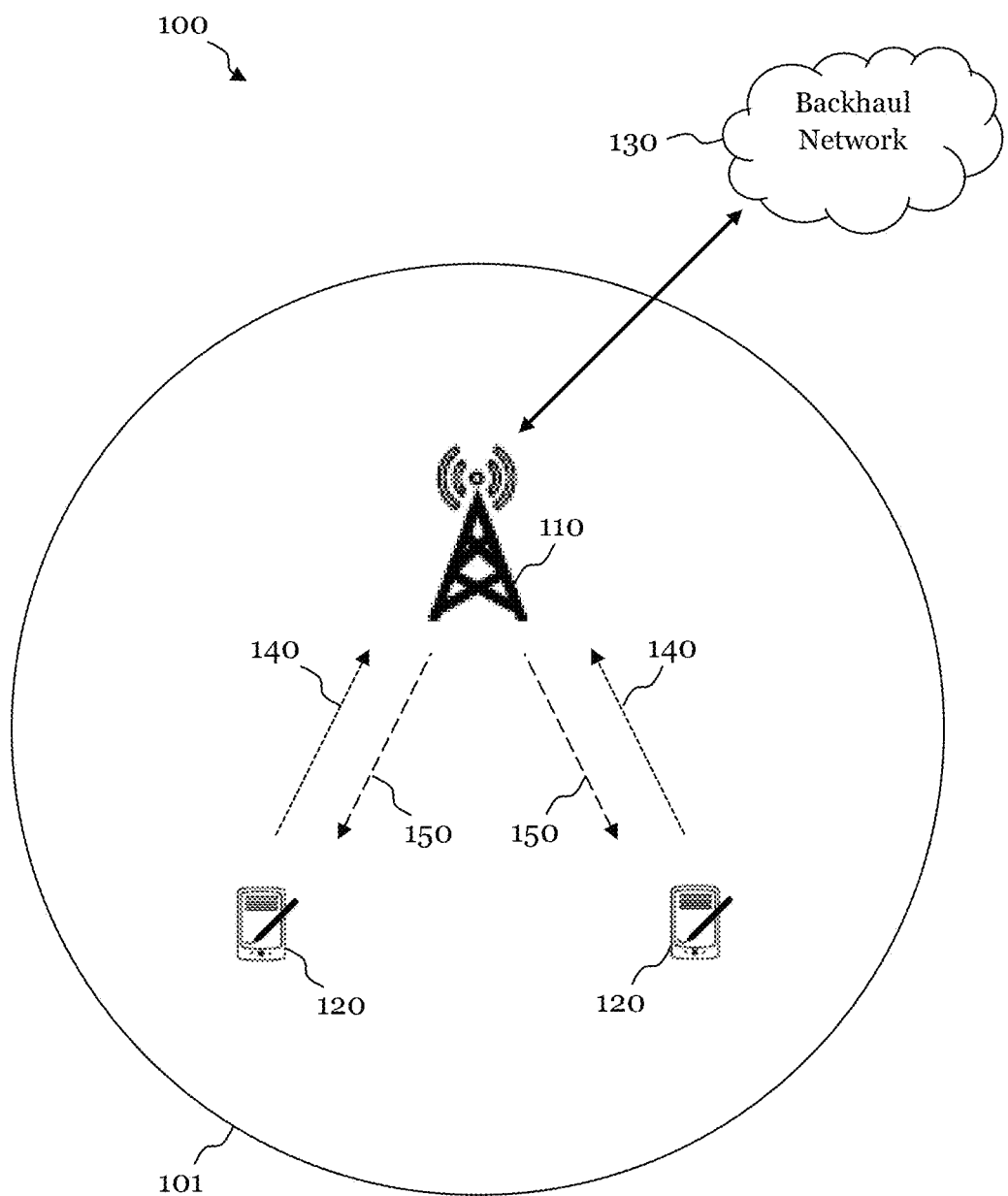
FIG. 1 is a diagram of a network, according to some embodiments.

FIG. 1 is a diagram of a network 100 for communicating data. The network 100 comprises a base station 110 having a coverage area 101, a plurality of mobile devices 120, and a backhaul network 130. As shown, the base station 110 establishes uplink connections 140 and downlink connections 150 with the mobile devices 120, which serve to carry data from the mobile devices 120 to the base station 110 and vice versa. Data carried over the uplink and downlink connections 140 and 150 might include data communicated between the mobile devices 120, as well as data communicated to and from a remote end (not shown) by way of the backhaul network 130. As used herein, the term "base station" might refer to any component or collection of components configured to provide wireless access to a network, such as an evolved NodeB (eNB), a macro-cell, a femtocell, a Wi-Fi access point (AP), or other wirelessly enabled devices. Base stations might provide wireless access in accordance with one or more wireless communication protocols, such as NR, LTE, LTE Advanced (LTE-A), High Speed Packet Access (HSPA), or Wi-Fi 802.11a/b/g/n/ac. As used herein, the term "user equipment" (UE) might refer to any component or collection of components capable of establishing a wireless connection with a base station, such as a mobile station (STA), or other wirelessly enabled devices. In some embodiments, the network 100 might comprise various other wireless devices, such as relays or low power nodes.

It is contemplated that future NR wireless networks might support separate power control processes for transmission of different data channels or reference signals, such as the PUSCH, the SRS, and the Physical Uplink Control Channel (PUCCH). In NR systems that use beamforming, the NR standards might support beam-specific power control. The NR standards might support numerology-specific and/or waveform-specific power control. Numerology refers to the set of physical layer parameters and might in some cases refer specifically to the subcarrier spacing and the Cyclic Prefix (CP) length, and a waveform can be orthogonal frequency division multiplexing (OFDM) or Discrete Fourier Transform Spread OFDM (DFT-S-OFDM). It is further contemplated that future NR wireless networks might support traffic-specific cases, which might be associated with other physical properties or parameters (e.g., numerology, radio network temporary identifier (RNTI), etc.). For these and other reasons, improved uplink power control schemes might be needed for use in NR systems.

The present disclosure provides embodiments related to power control for the PUSCH and the SRS in NR systems. In particular embodiments, a plurality of power control sets having different values of power control parameters is made available to a UE. The UE is provided with information associating each of the power control sets with one or more properties related to the operation of the UE. The providing scheme might be at least one of predefinition, broadcast signaling and dedicated signaling from the network side. When one or more of the operational properties is in effect on the UE, the UE uses the power control set associated with the one or more of the operational properties to transmit a PUSCH and/or an SRS. A traffic-specific power control set might be associated with one or more specific physical layer identifiers, such as an RNTI. In addition, a power control set might be associated with one or more resource unit-specific parameters, such as numerology or a scheduling time unit length for PUSCH. Furthermore, power control sets that are SRS-specific might or might not use precoding and/or beamforming, might support different precoding and/or beamforming selection, and might support multiple numerologies. In addition, for a PUSCH and/or an SRS, a specific power control set might be associated with a waveform type and/or a pathloss-associated reference signal type.

Power control for the PUSCH will now be considered. In an embodiment, a UE is provided with at least two separate power control parameter sets for different PUSCH transmissions. The power control parameters in a set might include at least one of a cell-specific PUSCH initial target power, a UE group-specific PUSCH initial target power, a UE-specific PUSCH initial target power, a pathloss, a pathloss compensation factor, and/or a separate Transmit Power Command (TPC). The UE selects one of the power control sets for a PUSCH transmission based on the selected power control set's preconfigured association with one or more properties associated with the UE. For PUSCH transmissions, the properties associated with the UE might include at least one of resource assignment-associated properties, a control resource set for a Physical Downlink Control Channel (PDCCH), a scheduling unit length for PUSCH, downlink control information (DCI)-related information, a waveform type for PUSCH, and/or a downlink (DL) reference signal (RS) type for pathloss estimation.

Figure 2:
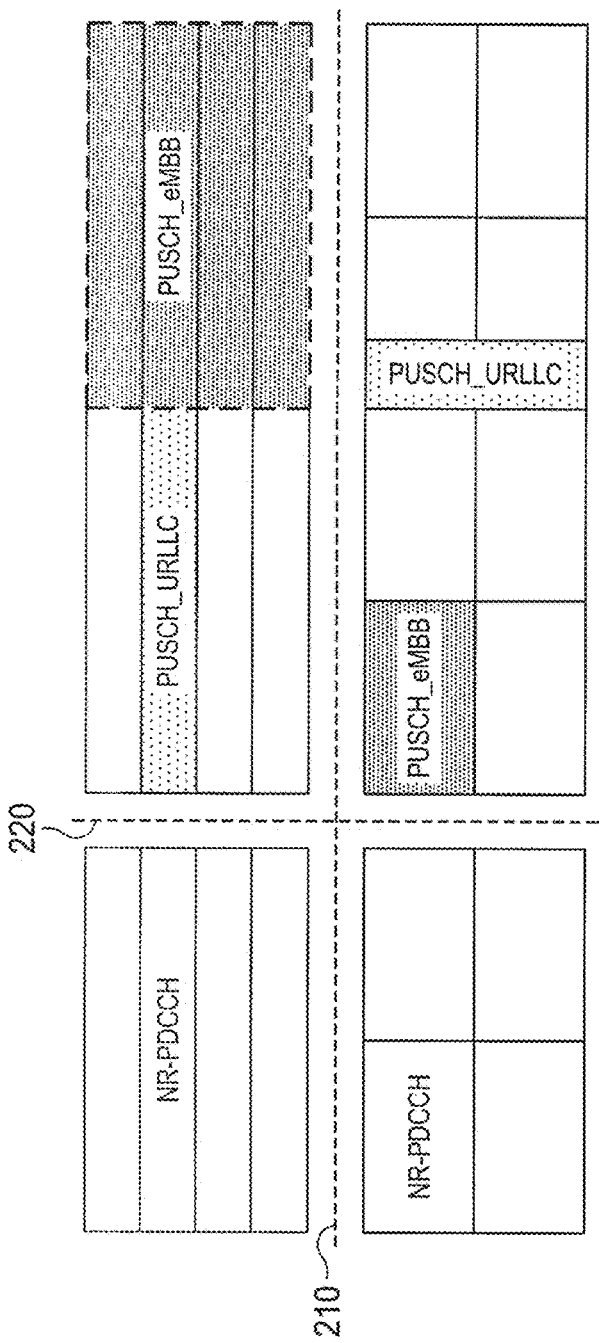
FIG. 2 is a diagram of power control for the PUSCH, according to some embodiments.

FIG. 2 summarizes some PUSCH-related cases. In this and subsequent similar drawings, frequency is represented on the vertical axis and time is represented on the horizontal axis. The dashed lines 210 and 220 distinguish different numerologies. It can be seen that, above the horizontal dashed line 210, a smaller subcarrier spacing and longer time units are used, and below the horizontal dashed line 210, a larger subcarrier spacing and smaller time units are used. To the left of the vertical dashed line 220, different NR-PDCCHs are present. Each NR-PDCCH might be configured with one resource set, and each resource set might be configured with one specific numerology. That is, a numerology might be associated with a NR-PDCCH channel and a resource set. To the right of the vertical dashed line 220, traffic might be distinguished as PUSCH Ultra-Reliable and Low-Latency Communications (URLLC) and PUSCH Enhanced Mobile Broadband (eMBB). The different types of traffic might be associated with different numerologies and different time unit lengths. Alternatively, different numerologies might be used for the same type of traffic.

In an embodiment, as mentioned above, a UE might select a power control set for a PUSCH transmission based on the selected power control set's preconfigured association with a resource assignment type. The preconfiguration scheme might be at least one of predefinition, broadcast signaling and dedicated signaling from the network side. The resource assignment type might be a resource assignment based only on DCI, might be a resource assignment based on DCI together with RRC and/or system information, or might be a resource assignment based only on RRC and/or system information. In the latter case, there is no DCI detection by the UE. One of the resource assignment types might be associated with a first power control set, and another of the resource assignment types might be associated with a second power control set. As a first example, a UE might use the first power control set when determining the PUSCH resource assignment based only on DCI and use the second power control set when determining the PUSCH resource assignment based only on RRC and/or system information. As a second example, a pathloss compensation factor of the first power control set might be configured by RRC signaling, and a pathloss compensation factor of the second power control set might be fixed. As a third example, a pathloss of the first power control set might be estimated based on the UE-specific DL RS for L3 measurement and/or L1/L2 measurement, and a pathloss of the second power control set might be estimated based only on the synchronization signal for L3 measurement.

Figure 3:
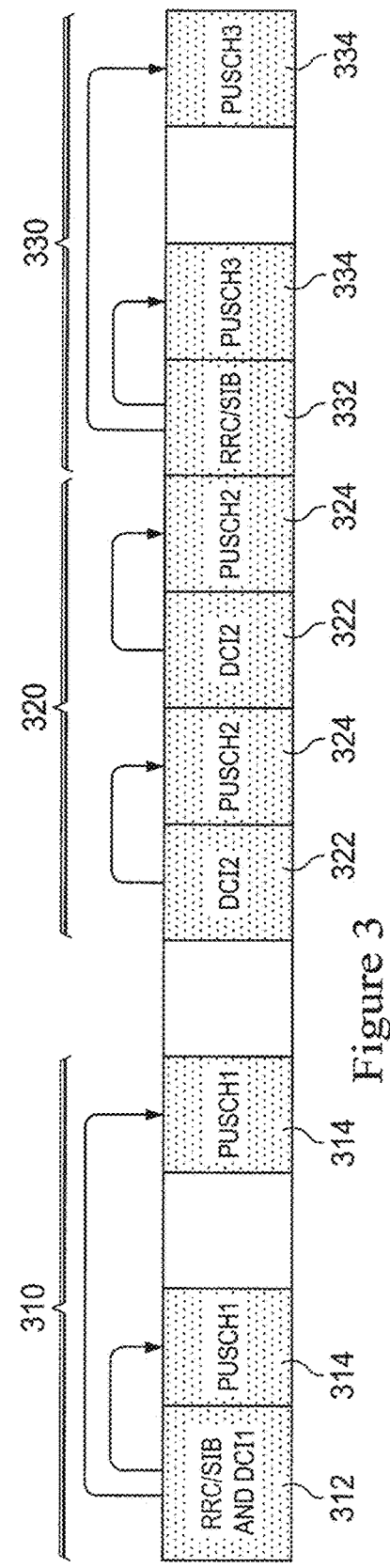
FIG. 3 is a diagram of power control for the PUSCH selected based on an association with a resource assignment type, according to some embodiments.

FIG. 3 illustrates an embodiment where a power control set for a PUSCH transmission is selected based on an association with a resource assignment type. In a first association 310, RRC and/or SIB together with a first DCI 312 are associated with a first PUSCH 314. In a second association 320, a second DCI 322 is associated with a second PUSCH 324. In a third association 330, RRC and/or SIB alone 332 are associated with a third PUSCH 334, and DCI is not used. The PUSCHs 314, 324, and 334 are transmitted with the power control sets associated with the resource assignment types.

In an embodiment, as mentioned above, a UE might select a power control set for a PUSCH transmission based on the selected power control set's preconfigured association with a control resource set for PUSCH assignment. The preconfiguration scheme might be at least one of predefinition, broadcast signaling and dedicated signaling from the network side. The control resource set might be associated with a control resource set index and/or a control resource set-associated numerology. One of the control resource sets might be associated with a first power control set, and another of the control resource sets might be associated with a second power control set. As a first example, if a UE detects a DCI for PUSCH from a control resource set associated with a first index and/or a first numerology, the first power control set might be used for PUSCH power control. The second power control set might be used once the UE detects a DCI for PUSCH from a control resource set associated with another index and/or another numerology. As a second example, a first cell-specific PUSCH initial target power for the first power control set and a second cell-specific PUSCH initial target power for the second power control set might be configured by the system information. As a third example, a first UE-specific PUSCH initial target power for the first power control set and a second UE-specific PUSCH initial target power for the second power control set might be configured by RRC signaling. As a fourth example, a first pathloss compensation factor for the first power control set might be fixed or might be configured by RRC signaling, and a second pathloss compensation factor for the second power control set might be configured by RRC signaling. As a fifth example, a first TPC might be used for the first power control set, and a second TPC might be used for the second power control set.

Figure 4:
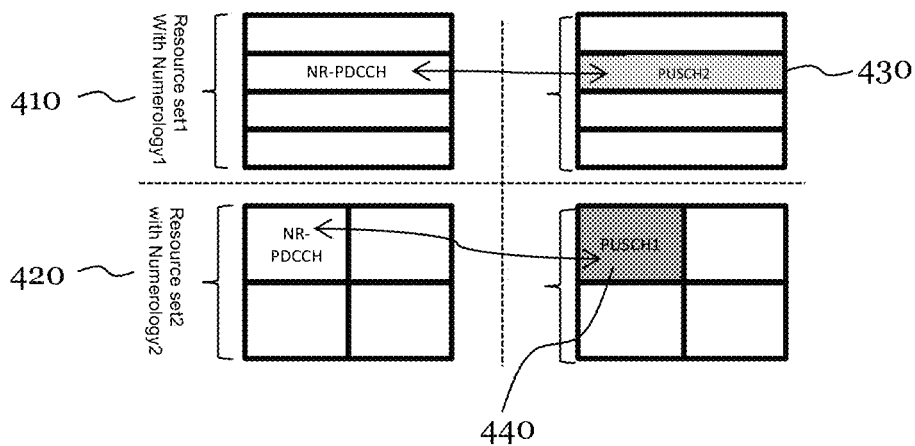
FIG. 4 is a diagram of power control for the PUSCH selected based on an association with a control resource set, according to some embodiments.

FIG. 4 illustrates an embodiment where a power control set for a PUSCH transmission is selected based on an association with a control resource set. A first control resource set 410 with a first numerology is used for a first PUSCH transmission 430, and a second control resource set 420 with a second numerology is used for a second PUSCH transmission 440. Different traffic might be associated with the different numerologies. An uplink grant might be associated with a control resource set and a specific numerology. The PUSCHs 430 and 440 are transmitted with the power control sets associated with the control resource sets 410 and 420.

In an embodiment, as mentioned above, a UE might select a power control set for a PUSCH transmission based on the selected power control set's preconfigured association with a scheduling time unit length for PUSCH. The preconfiguration scheme might be at least one of predefinition, broadcast signaling and dedicated signaling from the network side. The scheduling time unit length for the PUSCH transmission might be a number of OFDM symbols, a mini-slot, a slot, and/or a slot group. One of the scheduling time units might be associated with a first power control set, and another of the scheduling time units might be associated with a second power control set. As a first example, if a UE detects a scheduling time unit length with two OFDM symbols from a DCI for PUSCH, the first power control set might be used for PUSCH power control. The second power control set might be used once the UE detects another scheduling time unit length with seven OFDM symbols from a DCI. As a second example, a first cell-specific PUSCH initial target power for the first power control set and a second cell-specific PUSCH initial target power for the second power control set might be configured by the system information. As a third example, a common cell-specific PUSCH initial target power for both the first power control set and the second power control set might be configured by the system information. As a fourth example, a first UE-specific PUSCH initial target power for the first power control set and a second UE-specific PUSCH initial target power for the second power control set might be configured by RRC signaling. As a fifth example, a first pathloss compensation factor for the first power control set might be fixed or might be configured by RRC signaling, and a second pathloss compensation factor for the second power control set might be configured by RRC signaling. As a sixth example, a first TPC might be used for the first power control set, and a second TPC might be used for the second power control set.

Figure 5:
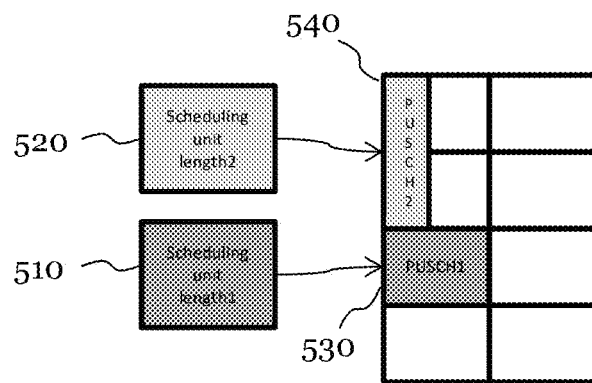
FIG. 5 is a diagram of power control for the PUSCH selected based on an association with a scheduling time unit length, according to some embodiments.

FIG. 5 illustrates an embodiment where a power control set for a PUSCH transmission is selected based on an association with a scheduling time unit length. A first scheduling unit length 510 is associated with a first PUSCH 530, and a second scheduling unit length 520 is associated with a second PUSCH 540. The PUSCHs 530 and 540 are transmitted with the power control sets associated with the scheduling time unit lengths 510 and 520.

In an embodiment, as mentioned above, a UE might select a power control set for a PUSCH transmission based on the selected power control set's preconfigured association with DCI-related information. The preconfiguration scheme might be at least one of predefinition, broadcast signaling and dedicated signaling from the network side. The DCI-related information for the PUSCH transmission might be an associated RNTI for a DCI mask and/or might be a DCI format or structure. Some DCI-related information might be associated with a first power control set, and other DCI-related information might be associated with a second power control set. As a first example, if a UE that is preconfigured with more than one RNTI detects a DCI for PUSCH which is masked with a first RNTI, the first power control set might be used for PUSCH power control. The second power control set might be used once the UE detects a DCI with a second RNTI. As a second example, if a UE that is preconfigured with more than one DCI format detects a DCI for PUSCH with a first format, the first power control set might be used for PUSCH power control. The second power control set might be used once the UE detects a DCI with a second format. As a third example, a first cell-specific PUSCH initial target power for the first power control set and a second cell-specific PUSCH initial target power for the second power control set might be configured by the system information. As a fourth example, a common cell-specific PUSCH initial target power for both the first power control set and the second power control set might be configured by the system information. As a fifth example, a first UE-specific PUSCH initial target power for the first power control set and a second UE-specific PUSCH initial target power for the second power control set might be configured by RRC signaling. As a sixth example, a first pathloss compensation factor for the first power control set might be fixed or might be configured by RRC signaling, and a second pathloss compensation factor for the second power control set might be configured by RRC signaling. As a seventh example, a first TPC might be used for the first power control set, and a second TPC might be used for the second power control set.

FIG. 6A illustrates an embodiment where a power control set for a PUSCH transmission is selected based on an association with DCI-related information. The DCI-related information is a plurality of RNTIs in this case. A first RNTI 610 is associated with a first PUSCH 630, and a second RNTI 620 is associated with a second PUSCH 640. The PUSCHs 630 and 640 are transmitted with the power control sets associated with the RNTIs 610 and 620.

FIG. 6B illustrates another embodiment where a power control set for a PUSCH transmission is selected based on an association with DCI-related information. The DCI-related information is a DCI format in this case. A first DCI format 650 is associated with a first PUSCH 670, and a second DCI format 660 is associated with a second PUSCH 680. The PUSCHs 670 and 680 are transmitted with the power control sets associated with the DCI formats 650 and 660.

In an embodiment, as mentioned above, a UE might select a power control set for a PUSCH transmission based on the selected power control set's preconfigured association with a waveform type for PUSCH. The preconfiguration scheme might be at least one of predefinition, broadcast signaling and dedicated signaling from the network side. The waveform type for the PUSCH transmission might be OFDM or might be DFT-S-OFDM. One waveform might be associated with a first power control set, and another waveform might be associated with a second power control set. As a first example, if a UE is configured with OFDM for PUSCH, the first power control set might be used for PUSCH power control. The second power control set might be used once the UE is configured with DFT-S-OFDM. As a second example, a first cell-specific PUSCH initial target power for the first power control set and a second cell-specific PUSCH initial target power for the second power control set might be configured by the system information. As a third example, a common cell-specific PUSCH initial target power for both the first power control set and the second power control set might be configured by the system information. As a fourth example, a first UE-specific PUSCH initial target power for the first power control set and a second UE-specific PUSCH initial target power for the second power control set might be configured by RRC signaling. As a fifth example, a first pathloss compensation factor for the first power control set might be configured by RRC signaling, and a second pathloss compensation factor for the second power control set might be fixed or might be configured by RRC signaling. As a sixth example, a first TPC might be used for the first power control set, and a second TPC might be used for the second power control set.

FIG. 7 illustrates an embodiment where a power control set for a PUSCH transmission is selected based on an association with a waveform type. At 710, an OFDM waveform is associated with a first PUSCH, and at 720 a DFT-S-OFDM waveform is associated with a second PUSCH.

In an embodiment, as mentioned above, a UE might select a power control set for a PUSCH transmission based on the selected power control set's preconfigured association with a DL RS type for pathloss estimation. The preconfiguration scheme might be at least one of predefinition, broadcast signaling and dedicated signaling from the network side. The DL RS type for pathloss estimation might be both a synchronization signal for Layer3 measurement and a UE-specific RS for Layer3 measurement; or might be both a UE-specific RS for Layer3 measurement and a UE-specific RS for Layer1 and/or Layer2 measurement; or might include a synchronization signal for Layer3 measurement, a UE-specific RS for Layer3 measurement, and a UE-specific RS for Layer1 and/or Layer2 measurement. A DL RS type for pathloss estimation might be associated with a first power control set, and another DL RS type for pathloss estimation might be associated with a second power control set. For example, once a UE is configured to estimate pathloss based on both L3 Reference Signal Received Power (RSRP) of a synchronization signal and L3 RSRP of a UE-specific Channel State Information Reference Signal (CSI-RS), the first power control set might be used for PUSCH power control. The second power control set might be used once the UE is configured to estimate pathloss based on both L3 RSRP of a UE-specific CSI-RS and L1 RSRP of a UE-specific CSI-RS or based on L3 RSRP of a UE-specific CSI-RS, L3 RSRP of a UE-specific CSI-RS, and L1 RSRP of a UE-specific CSI-RS.

Figure 8:
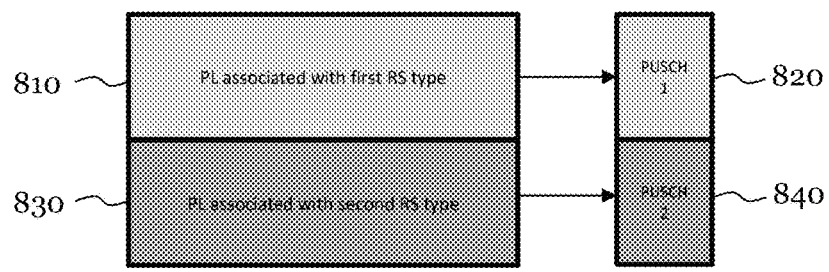
FIG. 8 is a diagram of power control for the PUSCH selected based on a pathloss-associated reference signal type, according to some embodiments.

FIG. 8 illustrates an embodiment where a power control set for a PUSCH transmission is selected based on an association with a DL RS type for pathloss estimation. A pathloss associated with a first reference signal type 810 is associated with a first PUSCH 820, and a pathloss associated with a second reference signal type 830 is associated with a second PUSCH 840.

In an embodiment, a UE computes a plurality of power headrooms for a plurality of PUSCH transmissions associated with different scheduling time unit lengths. The scheduling time unit lengths might be a number of OFDM symbols, a mini-slot, a slot, a slot group and/or an OFDM symbol time length associated with a specific numerology. A UE might generate different power headroom reports associated with different time unit lengths or different numerologies. If the UE transmits a first PUSCH associated with a first scheduling time unit length, a first power headroom might be computed based on the power control set parameters for the first PUSCH. If the UE transmits a second PUSCH associated with a second scheduling time unit length, a second power headroom might be computed based on the power control set parameters for the second PUSCH.

Figure 9:
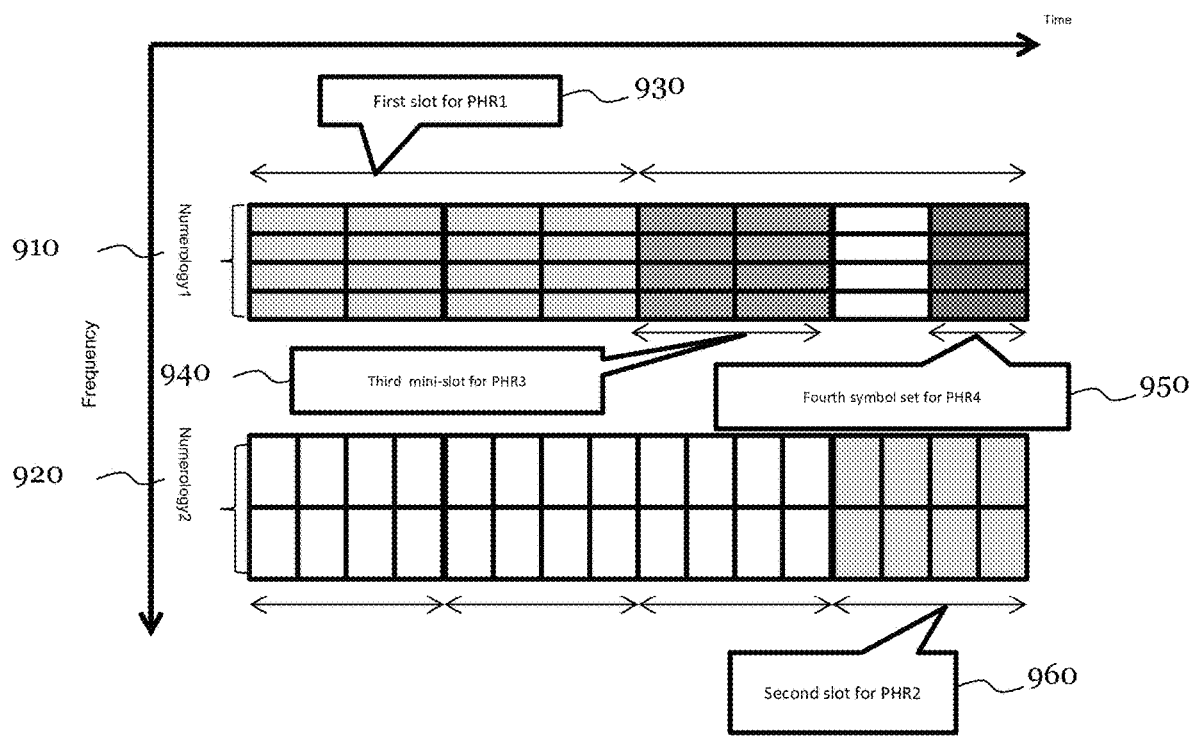
FIG. 9 is a diagram of power headroom reporting units, according to some embodiments.

FIG. 9 illustrates embodiments of different power headroom reporting units. For a first numerology 910, the time unit for a first power headroom report is a slot 930, the time unit for a third power headroom report is a mini-slot 940, and the time unit for a fourth power headroom report is a symbol set 950. For a second numerology 920, the time unit for a second power headroom report is a slot 960. The slot 960 for the second numerology 920 might have a different size from the slot 930 for the first numerology 910.

In general, for the PUSCH, a first set with power control-related parameters {P0_1 (the sum of the cell-specific power and the UE-specific power), Alpha_1 (the pathloss compensation factor), PL_1 (the pathloss), f_1 (the transmit power command)} is used for PUSCH1 with one or a combination of {BWP1 (the bandwidth part) or numerology1, resource assignments, DCI_Info1, SRI1 (the SRS resource index), and DL RS type1}, and a second set with power control-related parameters {P0_2, Alpha_2, PL_2, f_2} is used for PUSCH2 with one or a combination of {BWP2 or numerolgoy2, resource assignment2, DCI_Info2, SRI2, and DL RS type2}. Alpha_1 and Alpha_2 might be the same.

Power control for the SRS will now be considered. In an embodiment, a UE is provided with at least two separate power control parameter sets for different SRS transmissions. The power control parameters in a set might include at least one of a cell-specific PUSCH initial target power, a UE group-specific PUSCH initial target power, a UE-specific PUSCH initial target power, a UE-specific SRS initial target power, a pathloss, a pathloss compensation factor, and/or a separate TPC. The UE selects one of the power control sets for an SRS transmission based on the selected power control set's preconfigured association with one or more properties associated with the UE. For SRS transmissions, the properties associated with the UE might include resource information, such as the beamforming and/or precoding related information used in a beamforming and/or precoding scenario, numerology information, a scheduling time unit length for the associated PUSCH, a waveform type for SRS, and/or a DL RS type for pathloss estimation.

In an embodiment, a UE selects a power control set for an SRS transmission based on the selected power control set's preconfigured association with resource information for SRS transmission. The preconfiguration scheme might be at least one of predefinition, broadcast signaling and dedicated signaling from the network side. The resource information might be a configured resource index for SRS transmission (i.e., SRS resource index, (SRI)), or might be Quasi-Co-Location (QCL) information with a downlink CSI-RS, and/or might be a panel or beam pair link (BPL) index. The UE might transmit the SRS with or without beamforming and with or without precoding. When beamforming and/or precoding is used, beam-specific and/or precoding power control might be used, and the resource information might indicate to the UE whether beamforming and/or precoding will be used for SRS transmission. Moreover, the resource information might also include the transmission beam selection, which might be based on a network indication or might be triggered by the UE. A first portion of the resource information might be associated with a first power control set, and a second portion of the resource information might be associated with a second power control set. As a first example, a UE that is configured with multiple resource indexes for SRS transmission for beam pair link measurement and configured with resource-specific power control might use the first power control set for SRS transmitted with a first resource index and use the second power control set for SRS transmitted with a second resource index. As a second example, a UE that is configured with multiple resource indexes for SRS transmission for beam pair link measurement and configured with resource common power control might use a third power control set for SRS transmitted with different resource indexes. As a third example, a UE might use the third power control set for SRS when not configured with precoding and/or beamforming, and might use the first or second power control set for SRS when configured with precoding and/or beamforming. As a fourth example, a UE might use the third power control set for SRS when not configured with precoding and/or beamforming selection information and might use the first or second power control set for SRS when configured with precoding and/or beamforming selection information. The configuration scheme might be at least one of predefinition, broadcast signaling and dedicated signaling from the network side.

The first power control set for the SRS might be partially derived from the power control set for the first PUSCH associated with the first portion of the resource information, and the second power control set for the SRS might be partially derived from the power control set for the second PUSCH associated with the second portion of the resource information. For example, the first power control set for the SRS might be derived from at least one of the first cell-specific PUSCH initial target power; first UE group-specific PUSCH initial target power; first UE-specific PUSCH initial target power; first pathloss; first pathloss compensation factor; and first transmit power command which is for the first PUSCH. The second power control set for the SRS might be derived from at least one of the second cell-specific PUSCH initial target power; second UE group-specific PUSCH initial target power; second UE-specific PUSCH initial target power; second pathloss; second pathloss compensation factor; and second transmit power command which is for the second PUSCH. The third power control set for the SRS might be partially derived from the power control set for the PUSCH associated with reference resource information that may or may not be the same as the first and/or second portion of the resource information and/or from a separate power control set that is not associated with any PUSCH. As a first example, a UE-specific SRS initial target power for the third power control set for SRS might be derived from at least one of a first cell-specific PUSCH initial target power and a first UE-specific PUSCH initial target power for an associated first PUSCH, or from at least one of a second cell-specific PUSCH initial target power and a second UE-specific PUSCH initial target power for an associated second PUSCH. As a second example, a UE-specific SRS-specific initial target power for the third power control set for SRS might be independently configured by RRC signaling. As a third example, a pathloss for the third power control set for SRS might be derived from one of a first pathloss for an associated first PUSCH and a second pathloss for an associated second PUSCH. As a fourth example, a pathloss for the third power control set for SRS might be derived from both a first pathloss for an associated first PUSCH and a second pathloss for an associated second PUSCH. As a fifth example, a pathloss compensation factor for the third power control set for SRS might be the same as one of a first pathloss compensation factor for an associated first PUSCH and a second pathloss compensation factor for an associated second PUSCH. As a sixth example, a pathloss compensation factor for the third power control set for SRS might be fixed or might be independently configured by RRC signaling. As a seventh example, a transmit power command for the third power control set for SRS might be derived from one of a first transmit power command for an associated first PUSCH and a second transmit power command for an associated second PUSCH. As an eighth example, a transmit power command for the third power control set for SRS might be derived from both a first transmit power command for an associated first PUSCH and a second transmit power command for an associated second PUSCH.

FIG. 10A illustrates an embodiment in a beamforming scenario where, among beams transmitted by a UE, a first beam 1010 carrying an SRS is associated with a first beam 1030 carrying a PUSCH, and a second beam 1020 carrying an SRS is associated with a second beam 1040 carrying a PUSCH. FIG. 10B illustrates an embodiment in a beamforming scenario where, among beams transmitted by a UE, the first beam 1010 carrying an SRS and the second beam 1020 carrying an SRS are both associated with the first beam 1030 carrying a PUSCH.

In an embodiment, in a case where a UE selects a power control set for an SRS transmission based on the selected power control set's preconfigured association with numerology information for SRS transmission, the numerology information might be a configured numerology for SRS transmission and/or a configured numerology for a control resource set from which DCI for triggering the SRS transmission might be monitored. In the case where the numerology information is a configured numerology for SRS transmission, the configuration scheme might be based on a dynamic indication and/or an RRC configuration. A first portion of the numerology information might be associated with a first power control set, and a second portion of the numerology information might be associated with a second power control set. The first power control set for the SRS might be partially derived from the power control set for the PUSCH associated with the first portion of the numerology information. The second power control set for the SRS might be partially derived from the power control set for the PUSCH associated with the second portion of the numerology information. As a first example, a UE that is configured with multiple resource sets with different numerologies for SRS transmission might use the first power control set for SRS transmitted with a first numerology and use the second power control set for SRS transmitted with a second numerology. As a second example, a UE that is configured with multiple control resource sets with different numerologies for SRS transmission might use the first power control set for SRS transmission that is triggered by the DCI detected from the first control resource set and use the second power control set for SRS transmission that is triggered by the DCI detected from a second control resource set.

FIG. 11 illustrates an embodiment where a power control set for an SRS transmission is selected based on an association with numerology information. A first resource set 1110 with a first numerology includes indication signaling that triggers a first SRS transmission 1130, and a second resource set 1120 with a second numerology includes indication signaling that triggers a second SRS transmission 1140. If a UE detects SRS transmission trigger signaling in a first PUSCH 1150, the UE uses a first power control set. If the UE detects SRS transmission trigger signaling in a second PUSCH 1160, the UE uses a second power control set.

In an embodiment, a UE selects a power control set for an SRS transmission based on the selected power control set's preconfigured association with a scheduling time unit length for an associated PUSCH. The preconfiguration scheme might be at least one of predefinition, broadcast signaling and dedicated signaling from the network side. The scheduling time unit length for the associated PUSCH transmission might be a number of OFDM symbols, a mini-slot, a slot, and/or a slot group. A first SRS associated with a PUSCH with a first scheduling time unit length might be associated with a first power control set, and a second SRS associated with a PUSCH with a second scheduling time unit length might be associated with a second power control set. The first power control set for the first SRS might be partially derived from the power control set for the PUSCH associated with the first scheduling time unit length. The second power control set for the second SRS might be partially derived from the power control set for the PUSCH associated with the second scheduling time unit length. An association with the PUSCH scheduling time unit length might be provided based on an RRC configuration and/or DCI that supports PUSCH assignment and an SRS trigger. For example, a UE that is configured with multiple PUSCH scheduling time unit lengths might use the first power control set for SRS transmission that is triggered by a DCI detected with a first scheduling time unit length and might use the second power control set for SRS transmission that is triggered by a DCI detected with a second scheduling time unit length.

Figure 12:
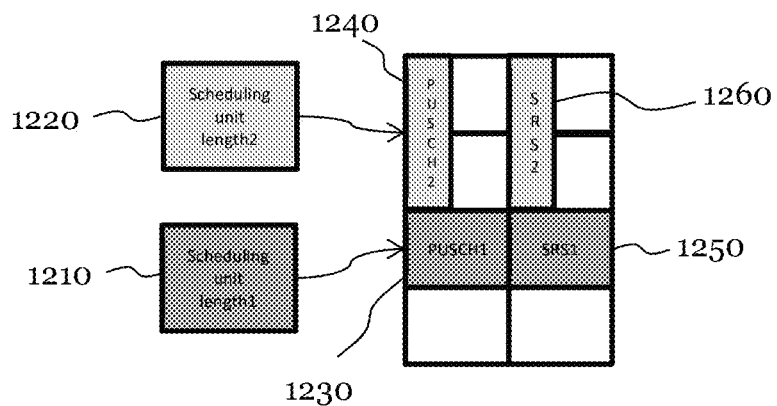
FIG. 12 is a diagram of power control for the SRS based on an association with a scheduling time unit length, according to some embodiments.

FIG. 12 illustrates an embodiment where a power control set for an SRS transmission is selected based on an association with a scheduling time unit length. A first scheduling unit length 1210 is associated with a first PUSCH 1230, and a second scheduling unit length 1220 is associated with a second PUSCH 1240. The first PUSCH 1230 is associated with a first SRS 1250, and the second PUSCH 1240 is associated with a second SRS 1260.

In an embodiment, a UE selects a power control set for an SRS transmission based on the selected power control set's preconfigured association with a waveform type for SRS. The preconfiguration scheme might be at least one of predefinition, broadcast signaling and dedicated signaling from the network side. The waveform type for the SRS transmission might be OFDM or might be DFT-S-OFDM. A first SRS associated with a first waveform type might be associated with a first power control set, and a second SRS associated with a second waveform type might be associated with a second power control set. As a first example, a UE that is configured with waveform types might use the first power control set for SRS transmission with OFDM and might use the second power control set for SRS transmission with DFT-S-OFDM. As a second example, a UE that is configured with multiple pathloss compensation factors might use the first pathloss compensation factor for SRS transmitted with a first waveform type and use the second pathloss compensation factor for SRS transmitted with a second waveform type.

Figure 13:
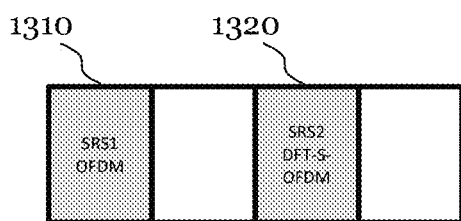
FIG. 13 is a diagram of power control for the SRS selected based on an association with a waveform type, according to some embodiments.

FIG. 13 illustrates an embodiment where a power control set for an SRS transmission is selected based on an association with a waveform type for SRS. At 1310, an OFDM waveform is associated with a first SRS, and at 1320 a DFT-S-OFDM waveform is associated with a second SRS.

In an embodiment, a UE selects a power control set for an SRS transmission based on the selected power control set's preconfigured association with a DL RS type for pathloss estimation. The preconfiguration scheme might be at least one of predefinition, broadcast signaling and dedicated signaling from the network side. The DL RS type for pathloss estimation might be both a synchronization signal for Layer3 measurement and a UE-specific RS for Layer3 measurement; or might be both a UE-specific RS for Layer3 measurement and a UE-specific RS for Layer1 and/or Layer2 measurement; or might include a synchronization signal for Layer3 measurement, a UE-specific RS for Layer3 measurement, and a UE-specific RS for Layer1 and/or Layer2 measurement. A DL RS type for pathloss estimation might be associated with a first power control set, and another DL RS type for pathloss estimation might be associated with a second power control set. For example, once a UE is configured to estimate pathloss based on both L3 RSRP of a synchronization signal and L3 RSRP of a UE-specific CSI-RS, the first power control set might be used for PUSCH power control. The second power control set might be used once the UE is configured to estimate pathloss based on both L3 RSRP of a UE-specific CSI-RS and L1 RSRP of a UE-specific CSI-RS or based on L3 RSRP of a UE-specific CSI-RS, L3 RSRP of a UE-specific CSI-RS, and L1 RSRP of a UE-specific CSI-RS.

Figure 14:
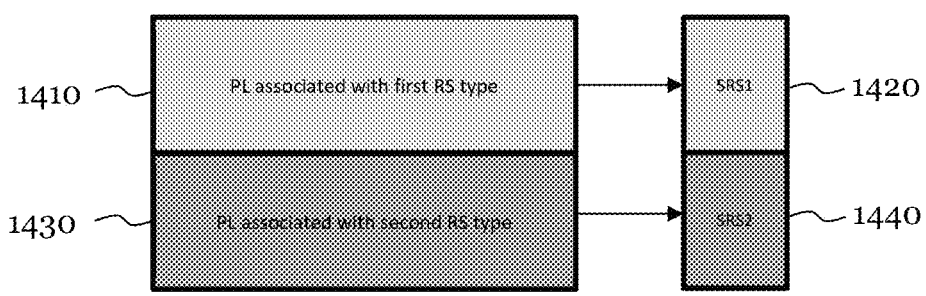
FIG. 14 a diagram of power control for the SRS selected based on a pathloss-associated reference signal type, according to some embodiments.

FIG. 14 illustrates an embodiment where a power control set for an SRS transmission is selected based on a DL RS type for pathloss estimation. A pathloss associated with a first reference signal type 1410 is associated with a first SRS 1420, and a pathloss associated with a second reference signal type 1430 is associated with a second SRS 1440.

Figure 15:
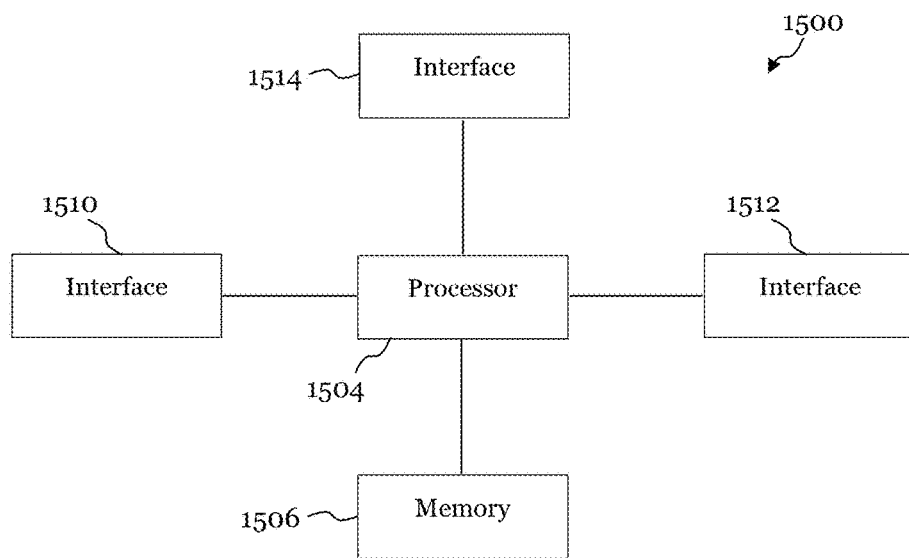
FIG. 15 is a block diagram of an embodiment processing system.

FIG. 15 illustrates a block diagram of an embodiment processing system 1500 for performing methods described herein, which may be installed in a host device. As shown, the processing system 1500 includes a processor 1504, a memory 1506, and interfaces 1510-1514, which may (or may not) be arranged as shown in the figure. The processor 1504 may be any component or collection of components adapted to perform computations and/or other processing related tasks, and the memory 1506 may be any component or collection of components adapted to store programming and/or instructions for execution by the processor 1504. In an embodiment, the memory 1506 includes a non-transitory computer readable medium. The interfaces 1510, 1512, 1514 may be any component or collection of components that allow the processing system 1500 to communicate with other devices/components and/or a user. For example, one or more of the interfaces 1510, 1512, 1514 may be adapted to communicate data, control, or management messages from the processor 1504 to applications installed on the host device and/or a remote device. As another example, one or more of the interfaces 1510, 1512, 1514 may be adapted to allow a user or user device (e.g., personal computer (PC), etc.) to interact/communicate with the processing system 1500. The processing system 1500 may include additional components not depicted in the figure, such as long term storage (e.g., non-volatile memory, etc.).

In some embodiments, the processing system 1500 is included in a network device that is accessing, or part otherwise of, a telecommunications network. In one example, the processing system 1500 is in a network-side device in a wireless or wireline telecommunications network, such as a base station, a relay station, a scheduler, a controller, a gateway, a router, an applications server, or any other device in the telecommunications network. In other embodiments, the processing system 1500 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 16:
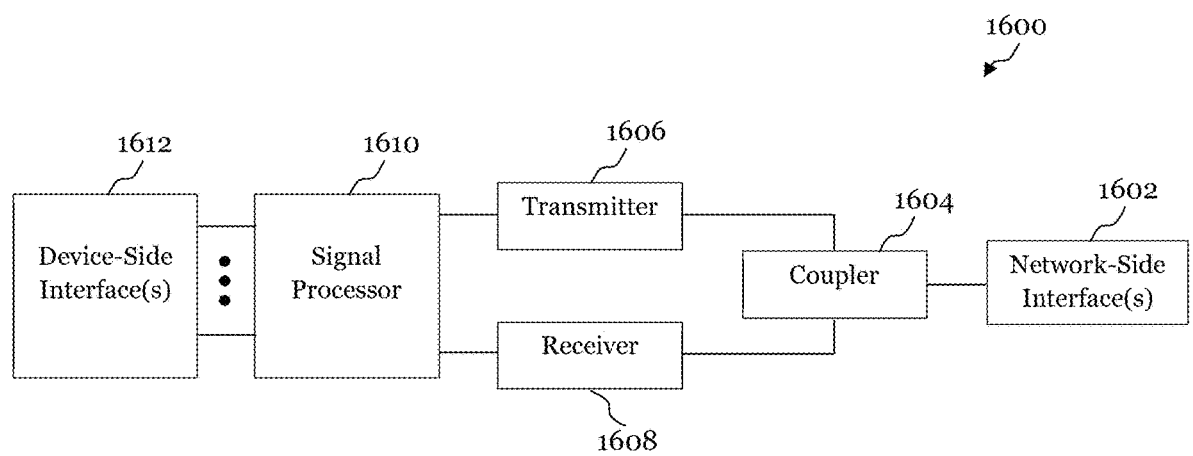
FIG. 16 is a block diagram of a transceiver.

In some embodiments, one or more of the interfaces 1510, 1512, 1514 connects the processing system 1500 to a transceiver adapted to transmit and receive signaling over the telecommunications network. FIG. 16 illustrates a block diagram of a transceiver 1600 adapted to transmit and receive signaling over a telecommunications network. The transceiver 1600 may be installed in a host device. As shown, the transceiver 1600 comprises a network-side interface 1602, a coupler 1604, a transmitter 1606, a receiver 1608, a signal processor 1610, and a device-side interface 1612. The network-side interface 1602 may include any component or collection of components adapted to transmit or receive signaling over a wireless or wireline telecommunications network. The coupler 1604 may include any component or collection of components adapted to facilitate bi-directional communication over the network-side interface 1602. The transmitter 1606 may include any component or collection of components (e.g., up-converter, power amplifier, etc.) adapted to convert a baseband signal into a modulated carrier signal suitable for transmission over the network-side interface 1602. The receiver 1608 may include any component or collection of components (e.g., down-converter, low noise amplifier, etc.) adapted to convert a carrier signal received over the network-side interface 1602 into a baseband signal. The signal processor 1610 may include any component or collection of components adapted to convert a baseband signal into a data signal suitable for communication over the device-side interface(s) 1612, or vice-versa. The device-side interface(s) 1612 may include any component or collection of components adapted to communicate data-signals between the signal processor 1610 and components within the host device (e.g., the processing system 1500, local area network (LAN) ports, etc.).

The transceiver 1600 may transmit and receive signaling over any type of communications medium. In some embodiments, the transceiver 1600 transmits and receives signaling over a wireless medium. For example, the transceiver 1600 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1602 comprises one or more antenna/radiating elements. For example, the network-side interface 1602 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1600 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Figure 17:
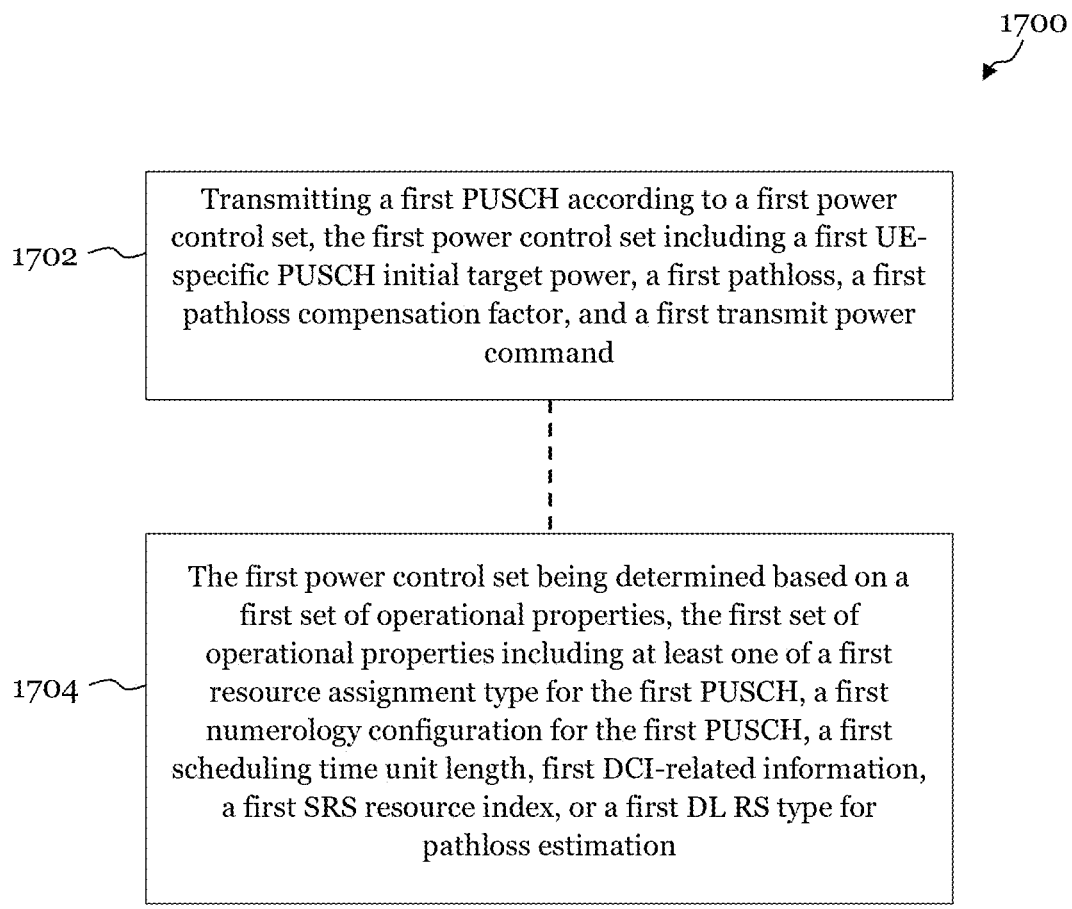
FIG. 17 is a flow diagram for operating a transmit-receive point.

FIG. 17 illustrates a method 1700 for operating a TRP. Block 1702 includes the TRP transmitting a first PUSCH according to a first power control set. The first power control set includes a first UE-specific PUSCH initial target power, a first pathloss, a first pathloss compensation factor, and a first transmit power command. Block 1704 shows the first power control set being determined based on a first set of operational properties. The first set of operational properties includes at least one of a first resource assignment type for the first PUSCH, a first numerology configuration for the first PUSCH, a first scheduling time unit length, first DCI-related information, a first SRS resource index, or a first DL RS type for pathloss estimation.

Figure 18:
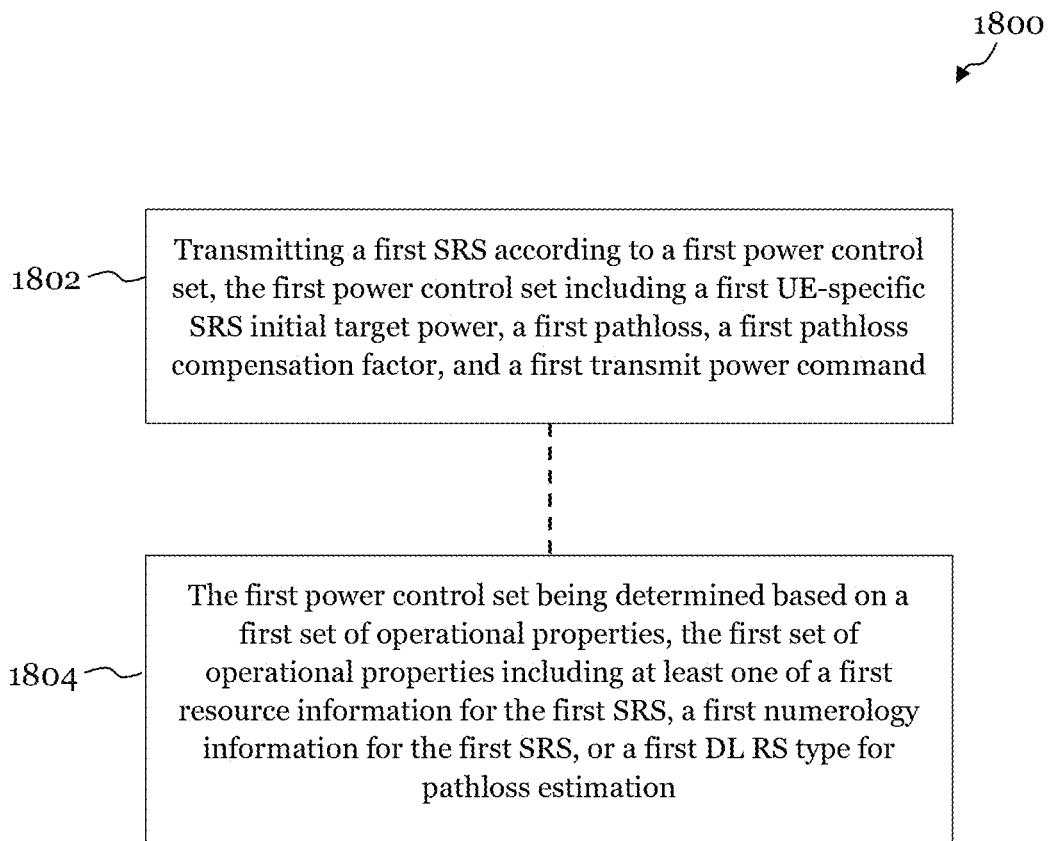
FIG. 18 is a flow diagram for uplink transmission by a user equipment.

FIG. 18 illustrates a method 1800 for uplink transmission by a UE. Block 1802 includes the UE transmitting a first SRS according to a first power control set. The first power control set including a first UE-specific SRS initial target power, a first pathloss, a first pathloss compensation factor, and a first transmit power command. Block 1804 shows the first power control set being determined based on a first set of operational properties. The first set of operational properties includes at least one of a first resource information for the first SRS, a first numerology information for the first SRS, or a first downlink (DL) reference signal (RS) type for pathloss estimation.

Figure 19:
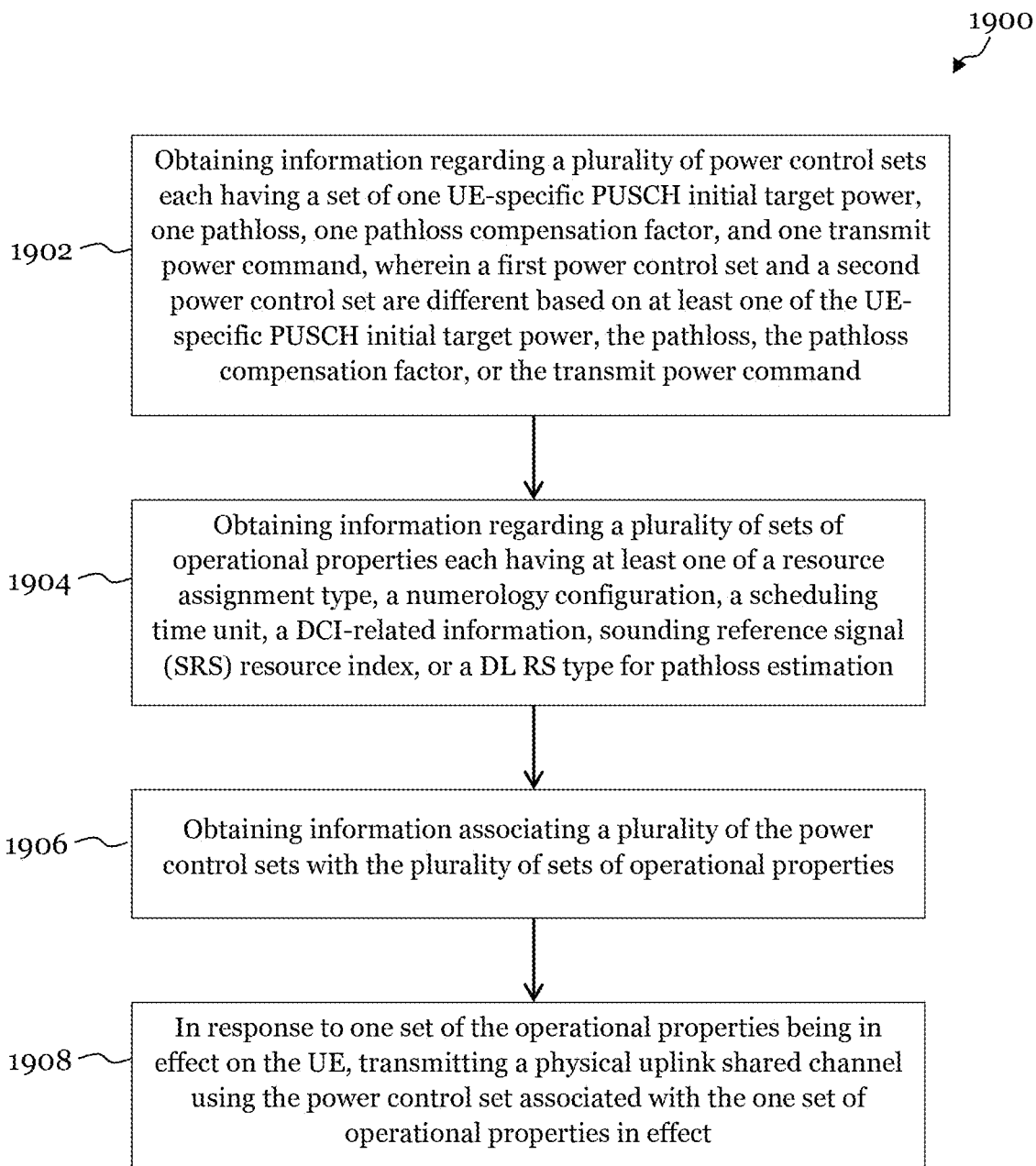
FIG. 19 is a flow diagram for uplink transmission by a user equipment.

FIG. 19 illustrates a method 1900 for uplink transmission by a UE. Block 1902 includes the UE obtaining information regarding a plurality of power control sets each having a set of one UE-specific PUSCH initial target power, one pathloss, one pathloss compensation factor, and one transmit power command. A first power control set and a second power control set are different based on at least one of the UE-specific PUSCH initial target power, the pathloss, the pathloss compensation factor, or the transmit power command. Block 1904 includes the UE obtaining information regarding a plurality of sets of operational properties each having at least one of a resource assignment type, a numerology configuration, a scheduling time unit, a DCI-related information, SRS resource index, or a DL RS type for pathloss estimation. Block 1906 includes the UE obtaining information associating a plurality of the power control sets with a plurality of sets of operational properties. Block 1908 includes the UE, in response to one set of the operational properties being in effect on the UE, transmitting a physical uplink shared channel using the power control set associated with the one set of operational properties in effect.

Figure 20:
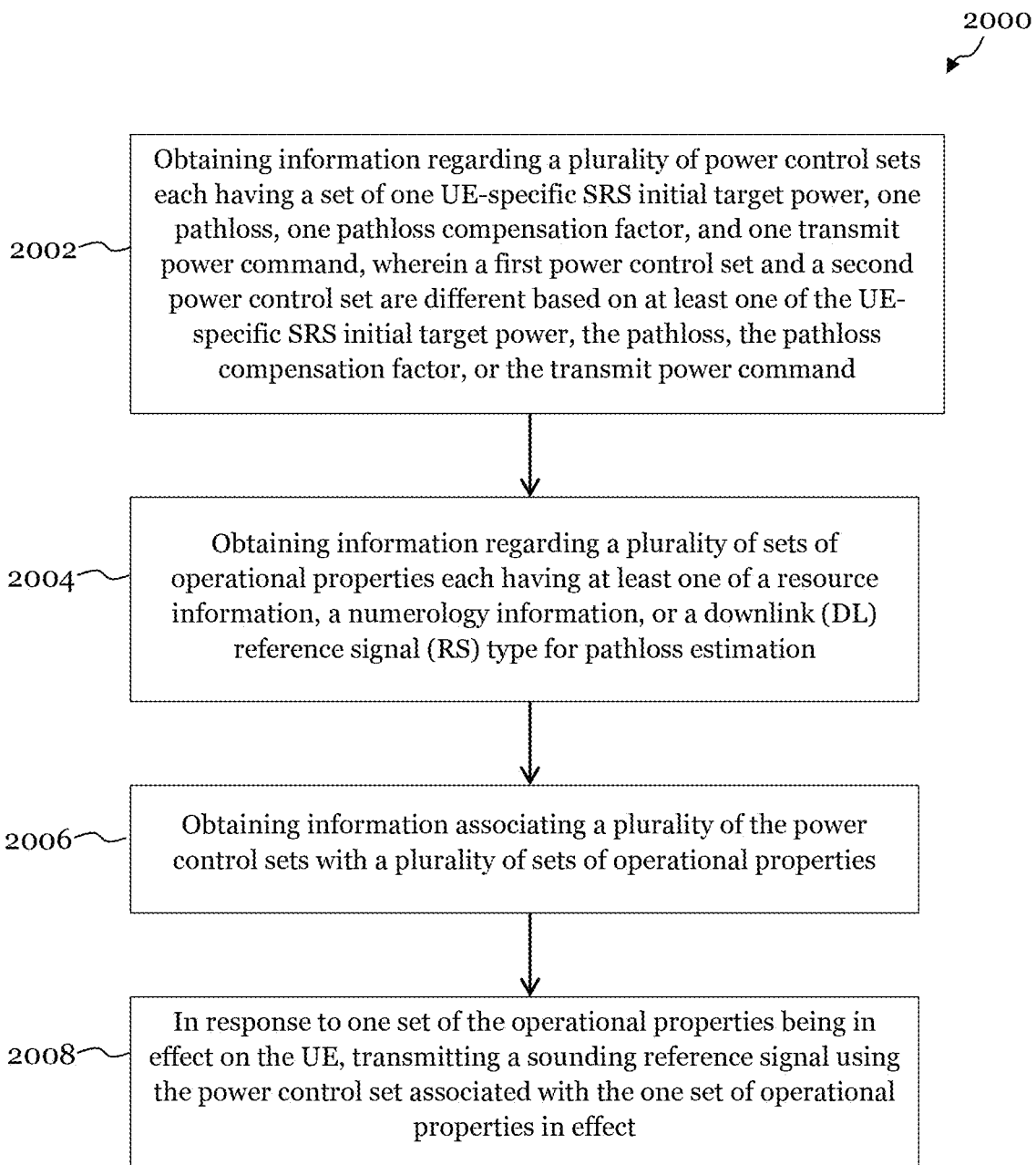
FIG. 20 illustrates a method for uplink transmission by a user equipment.

FIG. 20 illustrates a method 2000 for uplink transmission by a UE. Block 2002 includes the UE obtaining information regarding a plurality of power control sets each having a set of one UE-specific SRS initial target power, one pathloss, one pathloss compensation factor, and one transmit power command. A first power control set and a second power control set are different based on at least one of the UE-specific SRS initial target power, the pathloss, the pathloss compensation factor, or the transmit power command. Block 2004 includes the UE obtaining information regarding a plurality of sets of operational properties each having at least one of a resource information, a numerology information, or a DL RS type for pathloss estimation. Block 2006 includes the UE obtaining information associating a plurality of the power control sets with a plurality of sets of operational properties. Block 2008 includes the UE, in response to one set of the operational properties being in effect on the UE, transmitting a sounding reference signal using the power control set associated with the one set of operational properties in effect.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs).

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for uplink transmission by a user equipment (UE), the method comprising:
   obtaining numerology information for a sounding reference signal (SRS) transmission, wherein the numerology information for the SRS transmission is associated with a plurality of power control parameters, and the plurality of power control parameters include a SRS initial target power, a pathloss, a pathloss compensation factor, and a transmit power command (TPC);
   determining a value of the SRS initial target power, a value of the pathloss, and a value of the pathloss compensation factor in accordance with a radio resource control (RRC) configuration associated with the numerology information for the SRS transmission;
   determining a value of the TPC for the SRS transmission from a TPC for a physical uplink shared channel (PUSCH) in accordance with a SRS resource indication for the SRS transmission;
   determining a transmission power of an SRS in accordance with the value of the SRS initial target power, the value of the pathloss, the value of the pathloss compensation factor, and the value of the TPC for the SRS transmission; and
   transmitting the SRS using the transmission power.

2. The method of claim 1, wherein the SRS initial target power, the pathloss, and the pathloss compensation factor are associated with resource information for the SRS transmission.

3. The method of claim 1, wherein the determining the value of the TPC for the SRS transmission comprises:
   obtaining information of an association between SRS resource indication information and the TPC for the PUSCH;
   obtaining the SRS resource indication information;
   determining a value of the TPC for the PUSCH based on the association and the obtained SRS resource indication information; and
   determining the value of the TPC for the SRS transmission according to the value of the TPC for the PUSCH.

4. The method of claim 2, wherein the determining the value of the TPC for the SRS transmission comprises:
   obtaining information of an association between SRS resource indication information and the TPC for the PUSCH;
   obtaining the SRS resource indication information;
   determining a value of the TPC for the PUSCH based on the association and the obtained SRS resource indication information; and
   determining the value of the TPC for the SRS transmission according to the value of the TPC for the PUSCH.

5. The method of claim 1, wherein the plurality of power control parameters are associated with a downlink reference signal type for pathloss estimation.

6. The method of claim 2, wherein the plurality of power control parameters are associated with a downlink reference signal type for pathloss estimation.

7. The method of claim 6, wherein the downlink reference signal type comprises at least one of:
   a synchronization signal for Layer3 measurement; or
   a UE-specific RS for Layer3 measurement.

8. An apparatus, comprising:
   a non-transitory memory comprising instructions; and
   one or more processors in communications with the non-transitory memory, wherein the one or more processors are configured to execute the instructions to:
      obtain numerology information for a sounding reference signal (SRS) transmission, wherein the numerology information for the SRS transmission is associated with a plurality of power control parameters, and the plurality of power control parameters include a SRS initial target power, a pathloss, a pathloss compensation factor, and a transmit power command (TPC);
      determine a value of the SRS initial target power, a value of the pathloss, and a value of the pathloss compensation factor in accordance with a radio resource control (RRC) configuration associated with the numerology information for the SRS transmission;

determine a value of the TPC for the SRS transmission from a TPC for a physical uplink shared channel (PUSCH) in accordance with a SRS resource indication for the SRS transmission;

determine a transmission power of an SRS in accordance with the value of the SRS initial target power, the value of the pathloss, the value of the pathloss compensation factor, and the value of the TPC for the SRS transmission; and transmit the SRS using the transmission power.

9. The apparatus of claim 8, wherein the SRS initial target power, the pathloss, and the pathloss compensation factor are associated with resource information for the SRS transmission.

10. The apparatus of claim 8, wherein the one or more processors are further configured to execute the instructions to:

obtain information of an association between SRS resource indication information and the TPC for the PUSCH;

obtain the SRS resource indication information;

obtain a value of the TPC for the PUSCH based on the association and the obtained SRS resource indication information; and obtain the value of the TPC for the SRS transmission according to the value of the TPC for the PUSCH.

11. The apparatus of claim 9, wherein the one or more processors are further configured to execute the instructions to:

obtain information of an association between SRS resource indication information and the TPC for the PUSCH;

obtain the SRS resource indication information;

obtain a value of the TPC for the PUSCH based on the association and the obtained SRS resource indication information; and obtain the value of the TPC for the SRS transmission according to the value of the TPC for the PUSCH.

12. The apparatus of claim 8, wherein the plurality of power control parameters are associated with a downlink reference signal type for pathloss estimation.

13. The apparatus of claim 9, wherein the plurality of power control parameters are associated with a downlink reference signal type for pathloss estimation.

14. The apparatus of claim 13, wherein the downlink reference signal type comprises at least one of:

a synchronization signal for Layer3 measurement; or a UE-specific RS for Layer3 measurement.

15. A non-transitory computer-readable medium storing computer instructions, that when executed by one or more processors, cause an apparatus to perform operations of:

obtaining numerology information for a sounding reference signal (SRS) transmission, wherein the numerology information for the SRS transmission is associated with a plurality of power control parameters, and the plurality of power control parameters include a SRS initial target power, a pathloss, a pathloss compensation factor, and a transmit power command (TPC);

determining a value of the SRS initial target power, a value of the pathloss, and a value of the pathloss compensation factor in accordance with a radio resource control (RRC) configuration associated with the numerology information for the SRS transmission;

determining a value of the TPC for the SRS transmission from a TPC for a physical uplink shared channel (PUSCH) in accordance with a SRS resource indication for the SRS transmission;

determining a transmission power of an SRS in accordance with the value of the SRS initial target power, the value of the pathloss, the value of the pathloss compensation factor, and the value of the TPC for the SRS transmission; and transmitting the SRS using the transmission power.

16. The non-transitory computer-readable medium of claim 15, wherein the SRS initial target power, the pathloss, and the pathloss compensation factor are associated with resource information for the SRS transmission.

17. The non-transitory computer-readable medium of claim 15, the operations further comprising:

obtaining information of an association between SRS resource indication information and the TPC for the PUSCH;

obtaining the SRS resource indication information;

determining a value of the TPC for the PUSCH based on the association and the obtained SRS resource indication information; and determining the value of the TPC for the SRS transmission according to the value of the TPC for the PUSCH.

18. The non-transitory computer-readable medium of claim 16, the operations further comprising:

obtaining information of an association between SRS resource indication information and the TPC for the PUSCH;

obtaining the SRS resource indication information;

determining a value of the TPC for the PUSCH based on the association and the obtained SRS resource indication information; and determining the value of the TPC for the SRS transmission according to the value of the TPC for the PUSCH.

19. The non-transitory computer-readable medium of claim 15, wherein the plurality of power control parameters are associated with a downlink reference signal type for pathloss estimation.

20. The non-transitory computer-readable medium of claim 19, wherein the downlink reference signal type comprises at least one of:

a synchronization signal for Layer3 measurement; or a user equipment (UE)-specific RS for Layer3 measurement.

* * * * *